United States Patent [19]
Orimoto et al.

[11] Patent Number: 5,641,451
[45] Date of Patent: Jun. 24, 1997

[54] METHOD FOR FORMING HEAT-RESISTANT CONTAINERS

[75] Inventors: Hiroyuki Orimoto, Ueda; Katsumasa Yokota, Chiisagata-gun; Fumiya Amari, Komoro; Saburo Suzuki, Ueda, all of Japan

[73] Assignee: Nissei ASB Machine Co., Ltd., Komoro, Japan

[21] Appl. No.: 403,435

[22] Filed: Mar. 14, 1995

Related U.S. Application Data

[62] Division of Ser. No. 134,799, Oct. 12, 1993, Pat. No. 5,445,415.

[30] Foreign Application Priority Data

| Oct. 14, 1992 | [JP] | Japan | 4-302927 |
| Oct. 14, 1992 | [JP] | Japan | 4-302928 |
| Oct. 14, 1992 | [JP] | Japan | 4-302929 |
| Oct. 14, 1992 | [JP] | Japan | 4-302930 |

[51] Int. Cl.⁶ .................... B29C 49/18; B29C 49/64
[52] U.S. Cl. ................... 264/521; 264/530; 264/906; 425/526
[58] Field of Search ............... 264/520, 521, 264/530, 535, 906; 425/526

[56] References Cited

U.S. PATENT DOCUMENTS

| 3,752,641 | 8/1973 | Moore . | |
| 3,882,213 | 5/1975 | Uhlig | 264/535 |
| 4,063,867 | 12/1977 | Janniere | 425/526 |
| 4,729,732 | 3/1988 | Schad et al. . | |
| 5,232,715 | 8/1993 | Fukai | 425/526 |
| 5,281,387 | 1/1994 | Collette et al. | 264/521 |
| 5,322,651 | 6/1994 | Emmer | 264/535 |
| 5,338,181 | 8/1994 | Denis et al. . | |
| 5,352,402 | 10/1994 | Orimoto et al. | 264/521 |
| 5,370,834 | 12/1994 | Sorensen | 425/526 |

FOREIGN PATENT DOCUMENTS

| 0237459 | 9/1987 | European Pat. Off. . |
| 0425360 | 5/1991 | European Pat. Off. . |
| 0442836 | 8/1991 | European Pat. Off. . |
| 2704657 | 8/1977 | Germany . |
| 57-53326 | 3/1982 | Japan . |
| 3-205124 | 9/1991 | Japan . |
| 3-234520 | 10/1991 | Japan . |

*Primary Examiner*—Catherine Timm
*Attorney, Agent, or Firm*—Oliff & Berridge

[57] ABSTRACT

A heat-resistant container forming method includes a step of thermally shrinking a primary blow molded article in a heating furnace before secondary blow molding the primary blow molded article into a final product or container. Into the furnace, hot air which flows along the longitudinal direction of the first blow molded article and whose temperature enough to facilitate crystallization of the primary blow molded article. The primary blow molded article is thermally shrunk by exposing the entire circumferential surface of a barrel of the primary blow article to the hot air and by blowing the hot air longitudinally along the primary blow molded article to heat the barrel circumferentially uniformly. Since hot air touches the barrel as flowing longitudinally thereof, it is possible to increase the heat conductivity of boundary film of the primary blow molded article, without increasing the hot air temperature too high, so that temperature rise of the primary blow molded article is facilitated.

15 Claims, 15 Drawing Sheets

METHOD FOR FORMING HEAT-RESISTANT CONTAINERS

This is a division of application Ser. No. 08/134,799 filed Oct. 12, 1993 now U.S. Pat. No. 5,445,415.

BACKGROUND OF THE INVENTION

1. Field of the Invention

This invention relates to a method and apparatus for forming a heat-resistant synthetic resin container, and more particularly to such a method and apparatus in which a barrel and shoulder portions of a primary blow molded article is heated uniformly in a short time before secondary blow molding.

2. Description of the Related Art

Generally, a thin synthetic resin packing container called "a biaxially oriented blow container" is formed by placing in the mold an injection or extrusion molded preform of a suitable temperature for stretching and then by stretching the preform vertically or longitudinally while expanding the preform transversely with the pressure of gas blown into the preform.

However, the above-mentioned conventional container has a problem that the barrel portion of the container made of certain kinds of material would be deformed on filling up with the contents of high temperature.

Consequently a so-called oven blow molding method is proposed. In this conventional molding method, the blow molding step to be carried out after temperature control of the preform is divided into primary and secondary subdivided steps. In the primary blow molding, the article is formed so as to be longer than the final product to be obtained in the secondary blow molding. This primary blow molded article is then thermally shrunk by heat treatment, whereupon this article is secondary blow molded to form a final product. According to this conventional method, it is possible to obtain a heat-resistant container whose heat resistance is improved by heat treatment before the secondary blow molding.

FIG. 16 shows an article obtained by the oven blow molding. This oven blow molding method, as described in detail in, for example, Japanese Patent Laid-Open Publications Nos. HEI 3-205124 and HEI 3-234520, which are applicant's prior applications, comprises the step of obtaining a primary blow molded article 70 after temperature control of an injection or extrusion molded preform 60 having a suitable temperature for stretching, the step of obtaining a thermally shrunk article 80, and the step of obtaining a secondary blow molded product 90, the material of the preform 60 being polyethylene terephthalate (hereinafter abbreviated as PET), for example.

Specifically, the primary blow molded article 70 is obtained by stretching the preform 60 longitudinally with centering-guiding by a stretch rod (not shown) inserted into the preform 60 from its neck portion and, at the same time by expanding the longitudinally stretched preform 60 transversely by injecting pressurized fluid such as air into the preform 60.

The thermally shrunk article 80 is obtained by thermally shrinking the primary blow molded article 70 longitudinally and transversely by heating the article 70 in the atmosphere of 180° C. to 280° C. The thermally shrunk article 80 has a height substantially equal to or slightly longer than that of the final product, and a transverse size smaller than that of the final product.

The secondary blow molded product 90 is obtained by placing the thermally shrunk article 80 in the cavity of a secondary blow mold for molding the final product and then by introducing air into the thermally shrunk article 80 to be stretched transversely.

According to the oven blow molding method, during the heat treatment step to be carried out before the secondary blow molding, distortion created in the primary blow molding step is eliminated to increase the degree of crystallization so that the article will be resistant to severe temperature condition in the second blow molding step.

In order to obtain such a heat-resistant container, it is necessary to raise the temperature of the molded article to such an extent that the degree of crystallization can be improved.

However, in the conventional heating furnace, conventional heat transfer alone to the molded article in the atmosphere is insufficient for smooth raise of the temperature.

Since it would take a long time to get the temperature to a sufficiently level to obtain a certain degree of crystallization for adequate heat resistance of the article, it is required to lengthen the travelling path of the heated article or to protract the heating time, so that the molding apparatus including the travelling path for heating would be larger in size or the molding cycle would be longer.

In such heat treatment, it is also required to shrink the entire primary blow molded article uniformly to reduce the molding time during the secondary blow molding and to cause uniform heat resistance.

Practically on some occasions, however, the preform after temperature control would not retain a uniform circumferential temperature distribution. When the preform without a uniform circumferential temperature distribution undergoes the primary blow molding, the extent of circumferential stretch would vary locally to cause irregular wall thickness. Therefore, as the primary blow molded article having such non-uniform thickness is thermally treated, uniform thermal shrinking in the circumferential direction cannot be achieved. On some occasions, the circumferential shrinking would be irregular depending on the direction of hot air blow in the oven, and/or the coefficient of contraction would vary due to the difference in axial stretching magnification and wall thickness. When the thermally shrunk article is placed in the cavity and the mold is clamped for the second blow molding, the less shrunk portion would be sandwiched between the parting surfaces of the secondary blow mold and would be partly left as fins. Because of fins, the secondary blow molded article as the final product are used to be disposed of as a fault so that the yield of the heat-resistant container might be impaired.

SUMMARY OF THE INVENTION

With the conventional problems in view, it is an object of this invention to provide a heat-resistant container forming method which can reduce a time necessary to increase the temperature of a primary blow molded article so that a molding apparatus having a travelling path to be heated can be prevented from being large-sized.

Another object of the invention is to provide a heat-resistant container forming apparatus which can prevent part of a primary blow molded article from being sandwiched between the parting surfaces of a secondary blow mold to form fins when the thermally treated primary blow molded article is placed in the cavity of the mold, thus improving the yield of the container as a final product.

According to a first aspect of the invention, there is provided a method of forming a heat-resistant container, comprising the steps of: introducing a primary blow molded article into a heating furnace; thermally shrinking the primary blow molded article by exposing the entire circumferential surface of a barrel portion of the primary blow article to hot air having a temperature high enough to facilitate crystallization of the primary blow molded article by blowing the hot air longitudinally along the primary blow molded article; and secondary blow molding the thermally molded primary blow molded article in a cavity of a secondary blow mold composed of a pair of mold halves, thereby shaping the primary blow molded article into the heat-resistant container.

According to a second aspect of the invention, there is provided an apparatus for forming a heat-resistant container by thermally shrinking a primary blow molded article in a heating furnace and then secondary blow molding, wherein the heating furnace includes a hot air blow generator for blowing hot air at a given wind speed, whose temperature is such as to facilitate crystallization of the primary blow molded article, a first air blow guide member situated around a barrel portion of the primary blow molded article and extending longitudinally of the primary blow molded article, and an air supply port for supplying the hot air from the hot air blow generator inwardly of the first air blow guide member from the side of one end thereof, whereby the primary blow molded article is thermally shrunk by being blown by the hot air at a given wind speed longitudinally along the primary blow molded article while exposing the entire circumferential surface of a barrel portion of the primary blow article to the hot air and then guiding the hot air through the first air blow guide member.

With the method and apparatus of this invention, when thermally shrinking the primary blow molded article, the boundary film heat conductivity of the primary blow molded article is increased by moving the ejected hot air longitudinally along primary blow molded article, so that the amount of heat for the primary blow molded article receives is increased. Namely, a heating time can be reduced, which is necessary to secure an adequate degree of crystallization for obtaining a heat resistance for the final product. In addition, since hot air flows longitudinally along the primary blow molded article, the barrel can be heated circumferentially uniformly so that any irregular thickness can be prevented by thermal shrinking. The temperature to facilitate crystallization of the primary blow molded article is in a range of about 120° to 240° C., and the temperature of hot air is about 180° to 280° C. so as to increase the temperature of the primary blow molded article to the range.

Preferably, the first air blow guide members are situated on opposite sides of the travelling path of the primary blow molded article in the heating furnace, the hot air from the hot air blow generator is blown longitudinally along the primary blow molded article from one end toward the other inside the first air blow guide member. Further, the hot air after touching the barrel of the primary blow molded article may be collected in the hot air blow generator. In this case, the first air blow guide members serve as a guide for guiding hot air blow longitudinally along the primary blow molded article, and also as a partition dividing the air blow passageway into two: a first subdivided passageway for supplying hot air from the hot air blow generator and a second subdivided passageway for collecting hot air in the hot air blow generator.

A second air blow guide member may be situated opposite to the bottom of the primary blow molded article in the heating furnace for masking the bottom when the hot air from the hot air generator is blown upwardly from the bottom side of the primary blow molded article. With the second air blow guide member, it is possible to guide the hot air to the barrel while preventing the hot air from directly touching the bottom. It is thereby possible to prevent the bottom from being white-crystallized as excessively heated, so that the barrel can be heated efficiently.

A third air blow guide member may be situated around the shoulder of the primary blow molded article, sloping in conformity to the slope of the shoulder, so that the hot air can pass along the shoulder. It is thereby possible to increase the degree of crystallization of the shoulder having a low stretchability, and hence to improve the heat resistance.

Hot air may be blown over the primary blow molded article from the shoulder toward the barrel. In this case, hot air can be blown along the shoulder, without using the second and third air blow guide members, so that the hot air is prevented from directly touching the bottom.

By varying the wind speed and/or temperature of hot air, it is possible to control the heating time in such a manner that the density of the barrel necessary to secure heat resistance is at least 1.373 g/cm$^3$. In order to improve the heating efficiency by the change of boundary film heat conductivity and not to excessively increase the temperature of hot air, it is preferable that the wind speed of hot air is at least 0.6 m/sec. According to experiments, when the temperature and wind speed of hot air were set respectively to 230° to 260° C. and 0.6 to 4.0 m/sec, it was possible to reduce the heating time to at most one minute for the barrel to have a density of at least 1.373 g/cm$^3$.

In the thermally shrinking step immediately before the primary blow molding step, the confronting sidewalls of the primary blow molded article may be pressed inwardly to reform the outer diameter of the primary blow molded article in the direction parallel to the parting surfaces of the second blow mold so as to be smaller than the horizontal width of the mold cavity. Even if there is a difference in outer diameter of the primary blow molded article circumferentially due to the difference in extent of shrinking in the heat treatment, any part of the thermally shrunk article can be protected from being sandwiched between the mold halves when the mold is closed.

In this reforming step, when the increased inner pressure as the confronting sidewalls of the primary blow molded article are pressed is released, the size is corrected smoothly. The reforming step should preferably be performed under temperature control; it can therefore prevent the part of the primary blow molded article in contact with the reforming means from being excessively cooled or heated.

DETAILED DESCRIPTION

Figure 16:
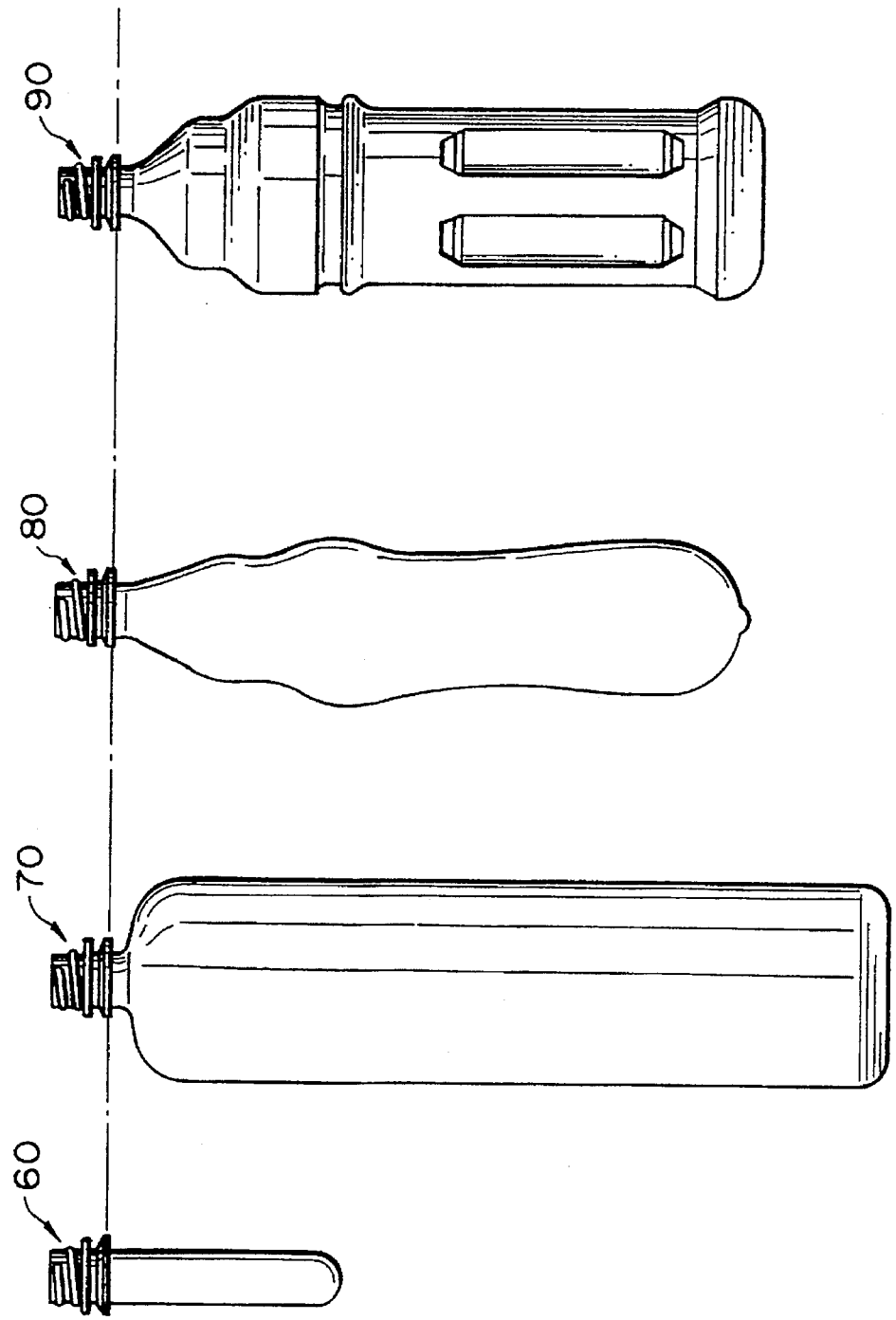
FIG. 16 is a schematic view showing a preform, articles and a final product according to the oven blow molding apparatus.

Details of this invention will now be described with reference to the accompanying drawings. Reference numerals designated to the articles are used the ones which are shown in FIG. 16.

This invention is characterized by facilitating temperature rise of the barrel of a primary blow molded article by accelerating heat conduction of air using hot air blow.

Specifically, the amount of heat to be received in the barrel is obtained by the following equation:

$$Q = A \cdot U \cdot \Delta t$$

where Q is the amount of heat, A is the surface area, U is the general heat conductivity to be obtained from the boundary film heat conductivity, and $\Delta t$ is the temperature difference.

Therefore, by increasing the general heat conductivity, it is possible to increase the amount of heat to be received by the barrel. In this invention, aiming at the fact that the boundary film heat conductivity influence on the general heat conductivity varies according to the wind speed of hot air, the amount of heat is increased by increasing the boundary film heat conductivity by accelerating the wind speed of hot air somehow.

In this invention, reduction of the time necessary to increase the degree of crystallization in the barrel of a primary blow molded article is facilitated by accelerating the temperature rise in the barrel according to the above-mentioned heat quantity increasing system.

An embodiment of a heat-resistant container forming apparatus using the above-mentioned principles will now be described with reference to the drawings.

Figure 1:
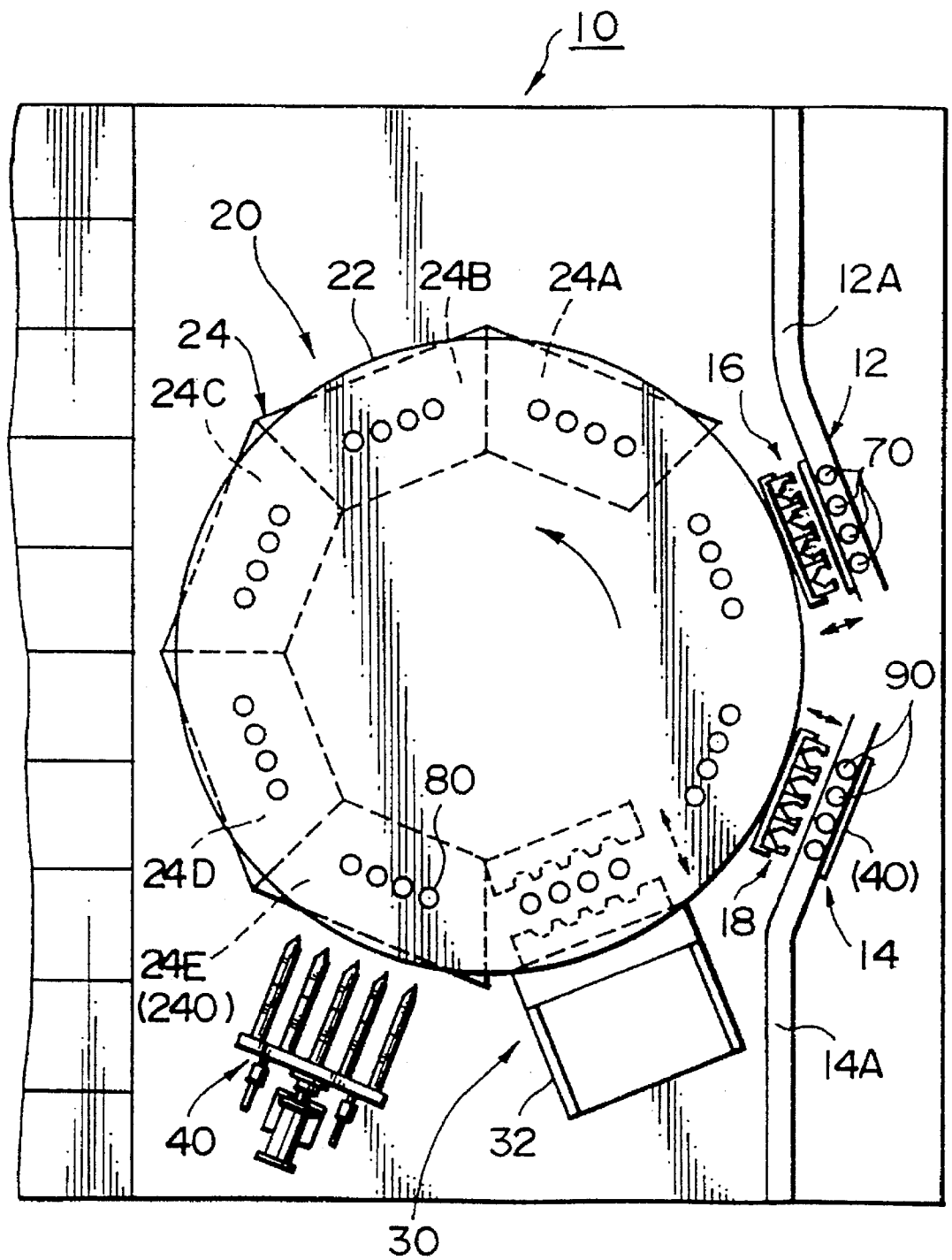
FIG. 1 is a plan view showing an entire oven blow stage in an oven blow molding apparatus for carrying out a container forming method of this invention.

FIG. 1 is a plan view showing an oven blow stage 20 of an oven blow molding apparatus 10 embodying this invention. In the oven blow stage 20, a rotary disc 22 is mounted on a frame of the oven blow molding apparatus 10.

The rotary disc 22 is intermittently rotatable in the direction of an arrow. On the rotating path of the rotary disc 22, there is situated a conveying station 12 having a travelling path for primary blow molded articles 70, and a discharge station 14 having a discharge path for secondary blow molded articles 90. Between these two stations, there are located first to fifth heating stations 24A to 24E and a secondary blow molding station 30. In the secondary blow molding station 30, a mold clamping means 32 having a secondary blow mold composed of mold halves is situated.

The rotary disc 22 has a structure for holding the neck of each article while a number of articles are moved to the individual station. This holding structure is exemplified by a cap member described in Japanese Patent Laid-Open Publication No. HEI 3-234520. Though it will be described later, in this embodiment, the cap member is in the form of a block for holding a set of four articles arranged along the periphery of the rotary disc 22. The rotary disc 22 is intermittently driven for rotation upon every termination of the second blow molding. Therefore, each set of four articles will be conveyed at once by one step.

In the conveying station 12 and the discharge station 14, there are situated respectively a supply means 16 and a discharge means 18 which are reciprocatingly movable toward and away from the rotary disc 22.

Figure 2:
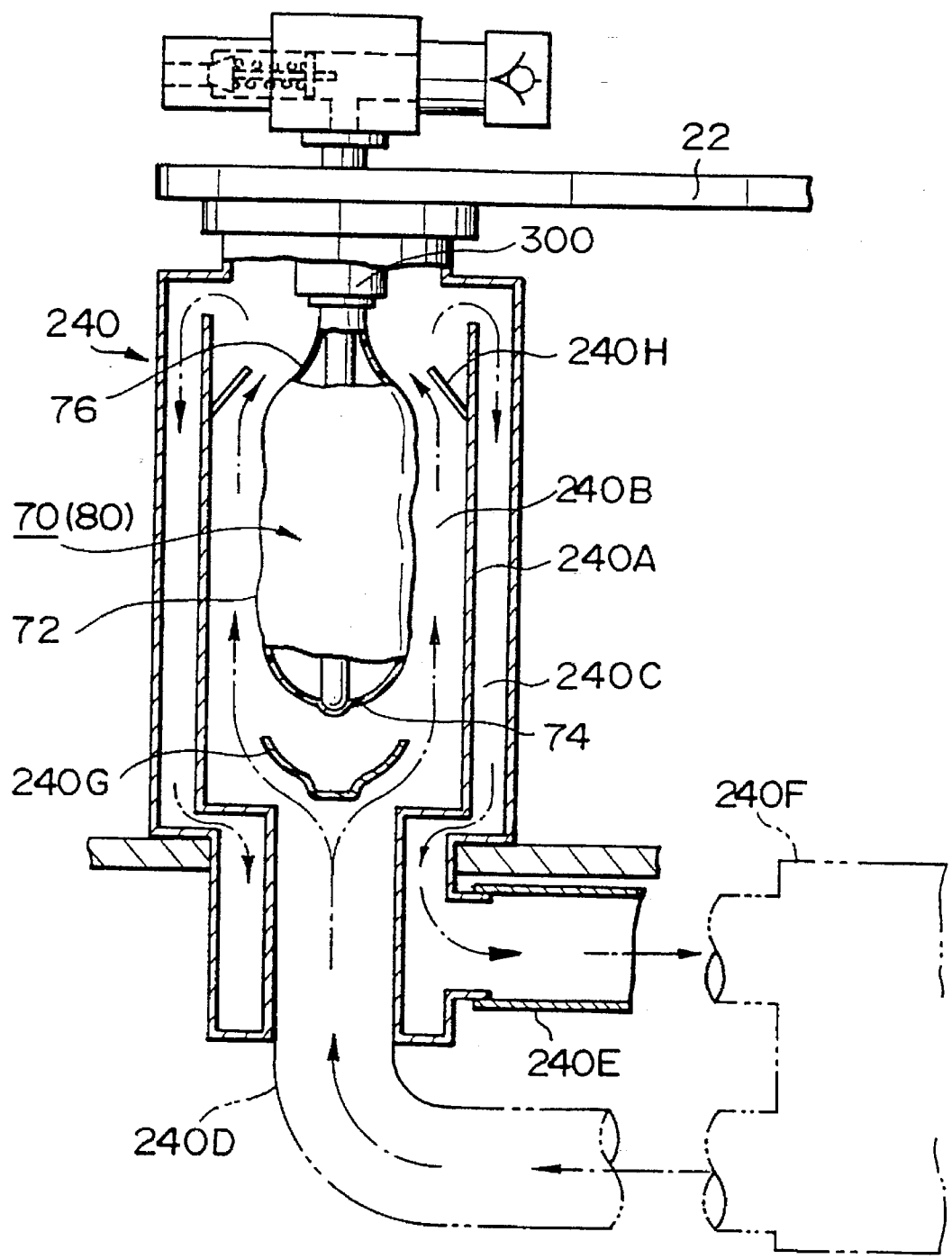
FIG. 2 is a fragmentary cross-sectional view showing the structure of a heating furnace mounted in the oven blow stage of FIG. 1.

On the other hand, a heating furnace 240 to be used in the first to fifth heating stations 24A to 24E, as shown in FIG. 2, is opening at its upper portion and has a partition (first air blow guide member) 240A dividing the interior into an inner space 240B and an outer space 240C. The partition 240A is located on each side of the travelling path of articles at each station 24A to 24E.

Each space is connected at its lower portion to a hot air blow generator 240F via air pipes 240D, 240E. The spaces communicate with each other via the open upper portion of the partition 240A. The hot air blow generator 240F is attached to the side portion of the molding apparatus 10; the hot air from the hot air blow generator 240F passes the air pipe 240D connected with the inner space 240B, is ejected from the lower portion of the inner space 240B, and is then returned to the hot air blow generator 240F en route the outer space 240C and the air pipe 240E via the open upper portion of the partition 240A.

Situated under the inner space 240B and the bottom 74 of the primary blow molded article 70 hanging in the space is a second air blow guide member 240G having a tray-shape cross section and has such a shape as to guide the hot air blow toward the barrel 72 of the primary blow molded article 70. The second air blow guide member 240G prevents the hot air, which is ejected from the hot air blow generator 240F, from being blown against the bottom 74 of the primary blow molded article 70. In each station 24A to 24E, the second air blow guide member 240G is situated in a lower position confronting the article stopped after moving intermittently. Alternatively, the second air blow guide member 240G may be in the form of guide blades to facilitate blowing the hot air in the circumferential direction.

At the partition 240A facing the shoulder 76 of the primary blow molded article 70, there is situated a third air blow guide member 240H extending into the inner space at an angle corresponding to the angle of inclination of the shoulder 76 so that the hot air flowing from the lower portion of the inner space 240B will be guided along the shoulder 76 of the primary blow molded article 70.

In this embodiment, the wind speed and temperature of the hot air ejected from the hot air blow generator 240F are set as follows:

It is a common knowledge that the density of material for a final product 90 to be obtained by the second blow molding should be at least 1.373 g/cm$^3$ in order to maintain the heat resistance of a thin container as the final product. In this embodiment, the wind speed and temperature of hot air are set to values to satisfy this condition.

Figure 3:
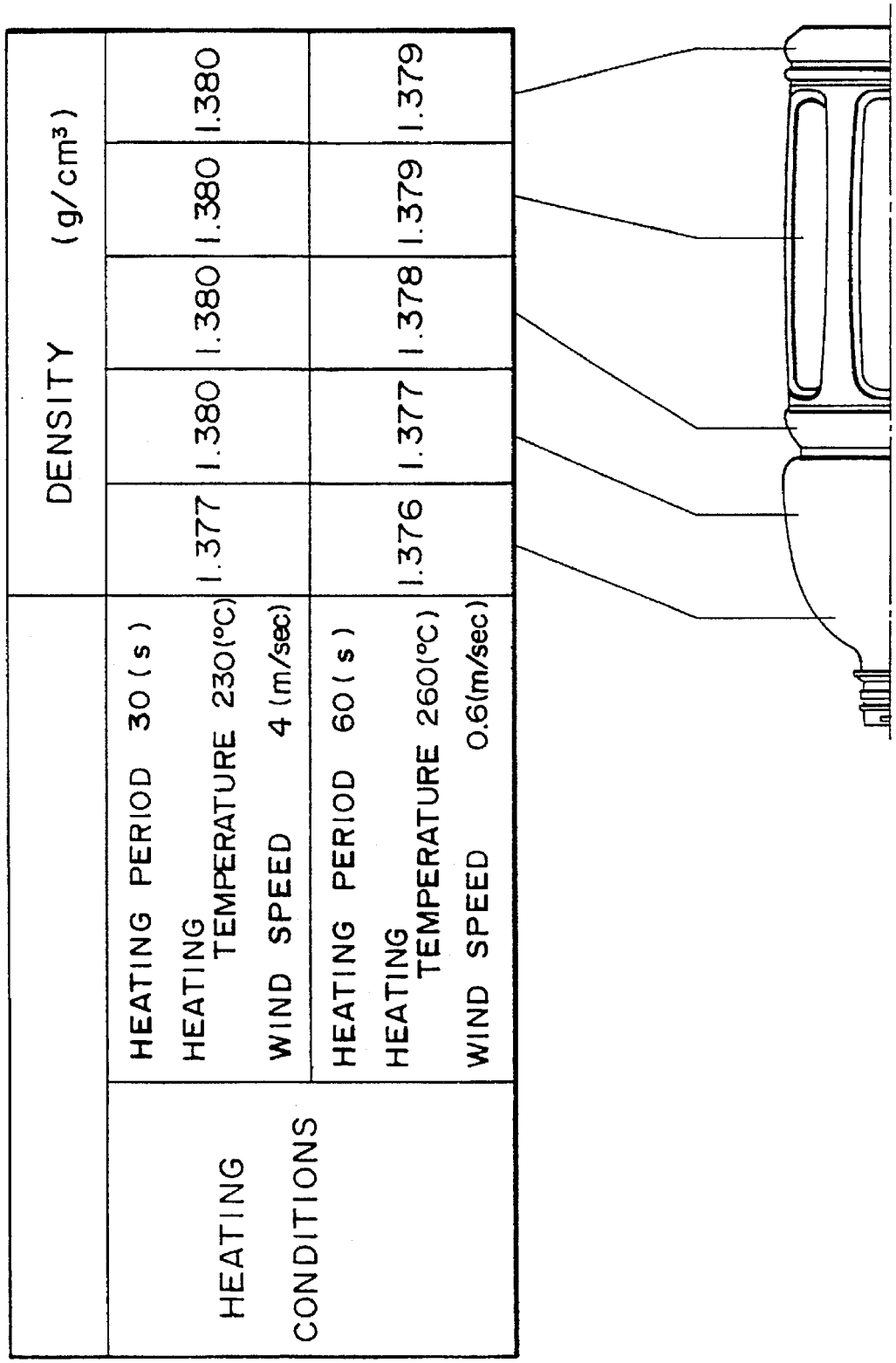
FIG. 3 is a characteristic diagram showing a relationship between the hot air generating conditions in the heating furnace of FIG. 2 and the degree of crystallization of a container under such conditions.

FIG. 3 shows two kinds of wind speed/temperature conditions for securing adequate density. FIG. 3 is a table showing the degrees of crystallization at various portions of the barrel of the primary blow molded article 70 obtained for the heating time that was obtained from the wind speed and temperature of hot air ejected from the hot air blow generator 240F.

As is apparent from FIG. 3, when the wind speed of hot air was relatively low or 0.6 m/sec and the heating temperature was necessarily high or 260° C., the degree of crystallization at each portion of the barrel 72 was obtained, in a relatively short time of one minute, in such a value as to satisfy the adequate density.

On the other hand, when the wind speed of hot air was increased to 4 m/sec, the substantially same degree of crystallization at various portions of the barrel 72 as that of the case of high temperature heating was obtained in a reduced heating time of 30 sec even at a low heating temperature of 230° C.

The degree of crystallization of the barrel 72 was obtained by heating the primary blow molded article up to 180° to 220° C. As is apparent from experimental data of FIG. 3, the slower the wind speed, a higher the hot air temperature is required. Partly since the apparatus would be subject to trouble when the temperature of hot air is too high, and partly since the increase of amount of heat due to the change of the boundary film conductivity when the wind speed of hot air is too small, it is preferable that the wind speed of hot air should be at least 0.6 m/sec.

The heating time for the primary blow molded article 70, as is apparent from the experimental data of FIG. 3, may be controlled by varying the wind speed and/or temperature of hot air.

The heating time is made shorter than conventional by adjusting the two parameters of hot air, and as a result, it is possible to make the total length of the heating furnaces 24A to 24E, where the primary blow molded articles 70 is heated, shorter than conventional. Even though the secondary blow molding cycle varies resulting from different shapes, etc. of articles, it is possible to cope with it easily by changing the heating time by adjusting the two parameters of hot air, without changing the total length of the heating furnaces 24A to 24E, thus improving the versatility.

With this arrangement, the hot air supplied from the hot air blow generator 240F is ejected from the lower portion of the inner space 240B in the heating furnace 240 at the wind speed of at least 0.6 m/sec. The ejected hot air flows around toward the barrel 72 of the primary blow molded article 70, touching the second air blow guide member 240G to avoid direct touch with the bottom 74. Then the hot air flows near the shoulder 76 along the primary blow molded article 70 as guided by the partition or first air blow guide member 240A. The hot air reached near the shoulder 76 flows along the shoulder 76 as guided by the third air blow guide member 240H and then flows into the outer space 240C of the heating furnace 240 through the gap between the third air blow guide member 240H and shoulder 76.

The entire primary blow molded article 70 except the bottom 74 is increased in degree of crystallization as temperatures rise at the barrel 72 and the shoulder 76, which are to be stretched during the second blowing molding, is accelerated, thus making such portions adequately resistant against heat. Further, since hot air is ejected longitudinally of the primary blow molded article 70, it is possible to bring hot air into touch with the barrel 72 and the shoulder 76 of the primary blow molded article 70 circumferentially uniformly, so that circumferentially uniform density also can be obtained.

In a comparative example, if hot air is ejected horizontally of the primary blow molded article 70, uniform air ejection over the entire circumference of the barrel 72 is difficult to achieve, and uniform heat distribution over the circumference cannot be secured as hot air reflected by the barrel 72 undergoes mutual interfering. As a result, non-uniform circumferential thermal shrink can be achieved so that the less shrunk part of the primary blow molded article would be sandwiched between the parting surfaces of the blow mold during the secondary blow molding. To the contrary, when hot air is blown vertically of the primary blow molded article, no part can be sandwiched between the parting surfaces.

In this embodiment, the direction of blowing hot air is upward from the lower side of the primary blow molded article 70. Alternatively, it may be downward from the upper side of the primary blow molded article 70.

Figure 4:
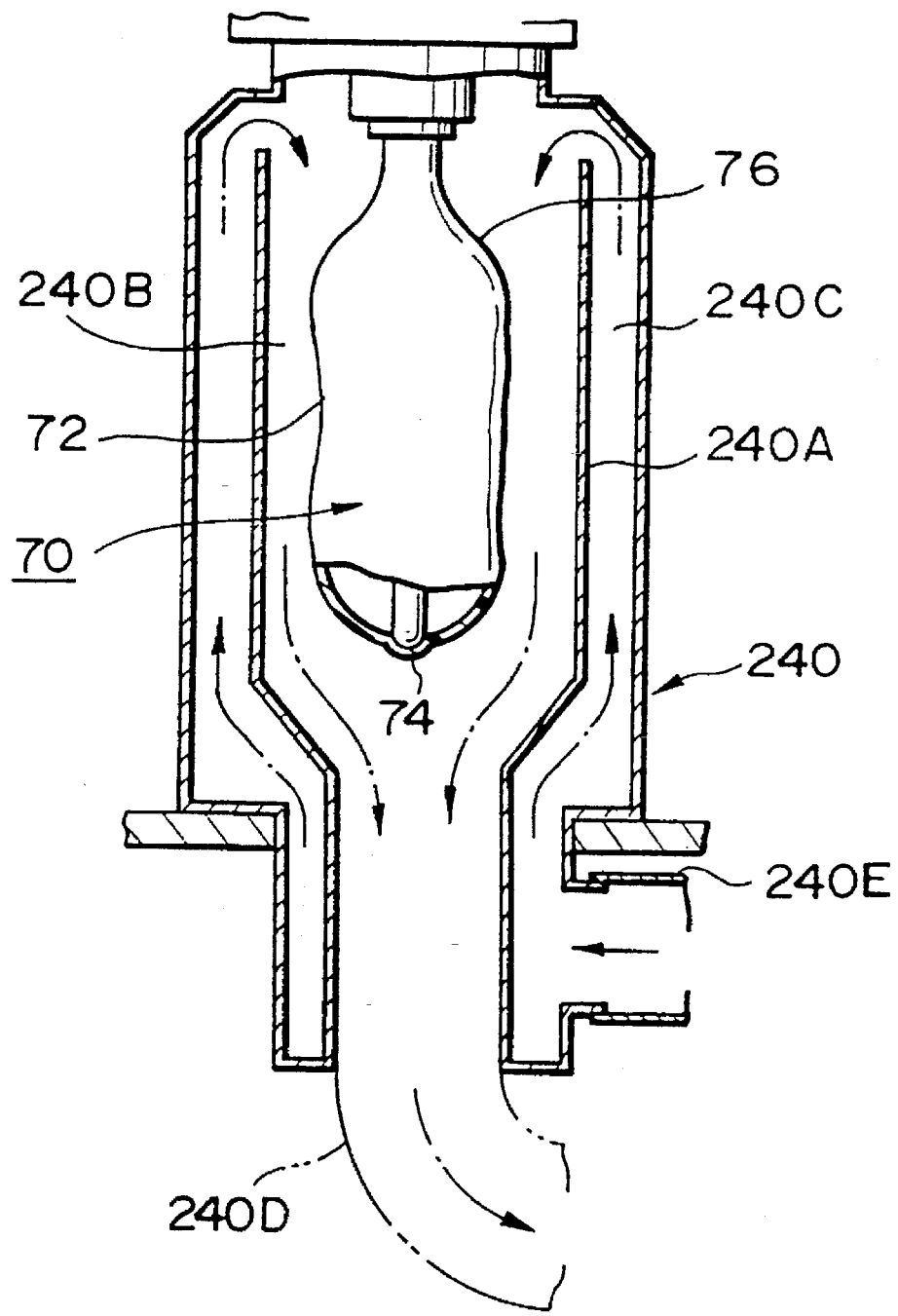
FIG. 4 is a fragmentary diagram showing a modified heating furnace.

FIG. 4 shows the structure of the heating furnace in this case. In the structure of FIG. 4, the hot air from the hot air blow generator 240F is introduced inside the partition 240A downwardly to the shoulder 76 of the secondary blow molded article 70 en route outside of the partition 240A. The hot air is driven to flow vertically from the shoulder 76 of the primary blow molded article 76 and is guided downwardly by the partition 240A while touching the shoulder 76 and the barrel 72. In this case, the guide members 240G, 240H of FIG. 2 may be omitted.

With this arrangement, since hot air does not touch the bottom 74 of the primary blow molded article 70 even in the absence of the second air blow guide member 240G, it is possible to prevent the bottom 74 from experiencing crystallization and hence whitening. In the primary blow molded article 70, it is possible to increase the degree of crystallization by increasing the density of material at the shoulder 76 whose stretching ratio is low.

Figure 5:
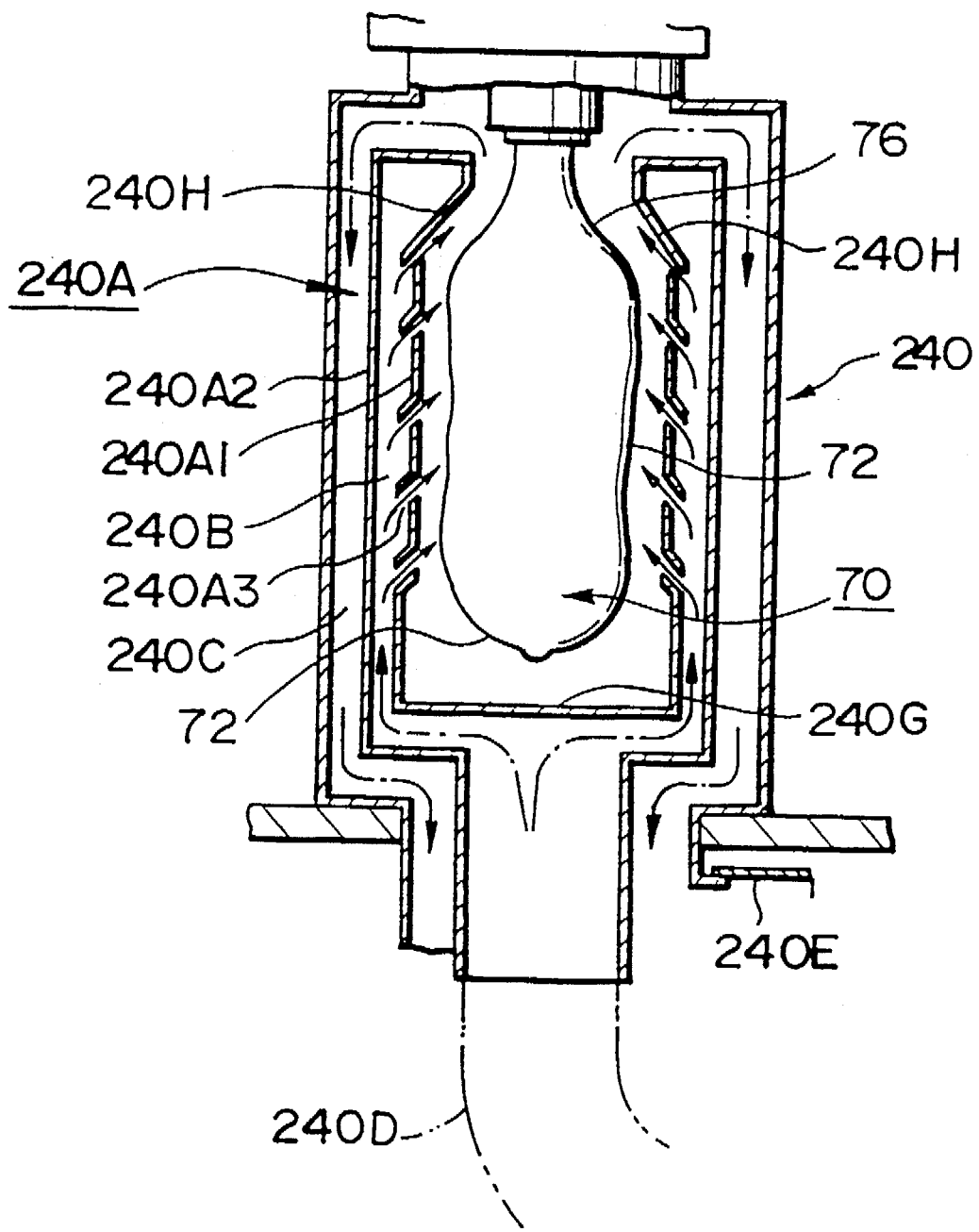
FIG. 5 is a fragmentary diagram showing another modified heating furnace.

FIG. 5 shows a modified form of the heating furnace structure. As shown in FIG. 5, the first air blow guide member 240A is a double-sidewall structure composed of inner and outer sidewalls 240A1, 240A2 with a hollow interior. The upper ends of sidewall 240A1, 240A2 are connected to each other to seal. The inner sidewall 240A1 is connected at its lower end to the second air blow guide member 240G facing the bottom 72 of the primary blow molded article 70 to mask the bottom 72. The outer sidewall 240A2 is connected at its lower end to the air pipe 240D. The sidewall 240A1 facing the primary blow molded article 70 has a plurality of hot air ejection holes 240A3 inclined in such a direction as to create hot air flow vertically along the primary blow molded article 70. In this case, the ejection holes 240A3 are directed upwardly so that hot air flows upwardly along the primary blow molded article 70.

According to this structure, it is possible to prevent whitening of the bottom of the article, to cause uniform temperature distribution in the circumferential direction of the article, to increase the wind speed of hot air by narrowing hot air flow with the ejection holes 240A3, and to increase the heat conduction speed at the circumferential wall of the article.

Figure 6:
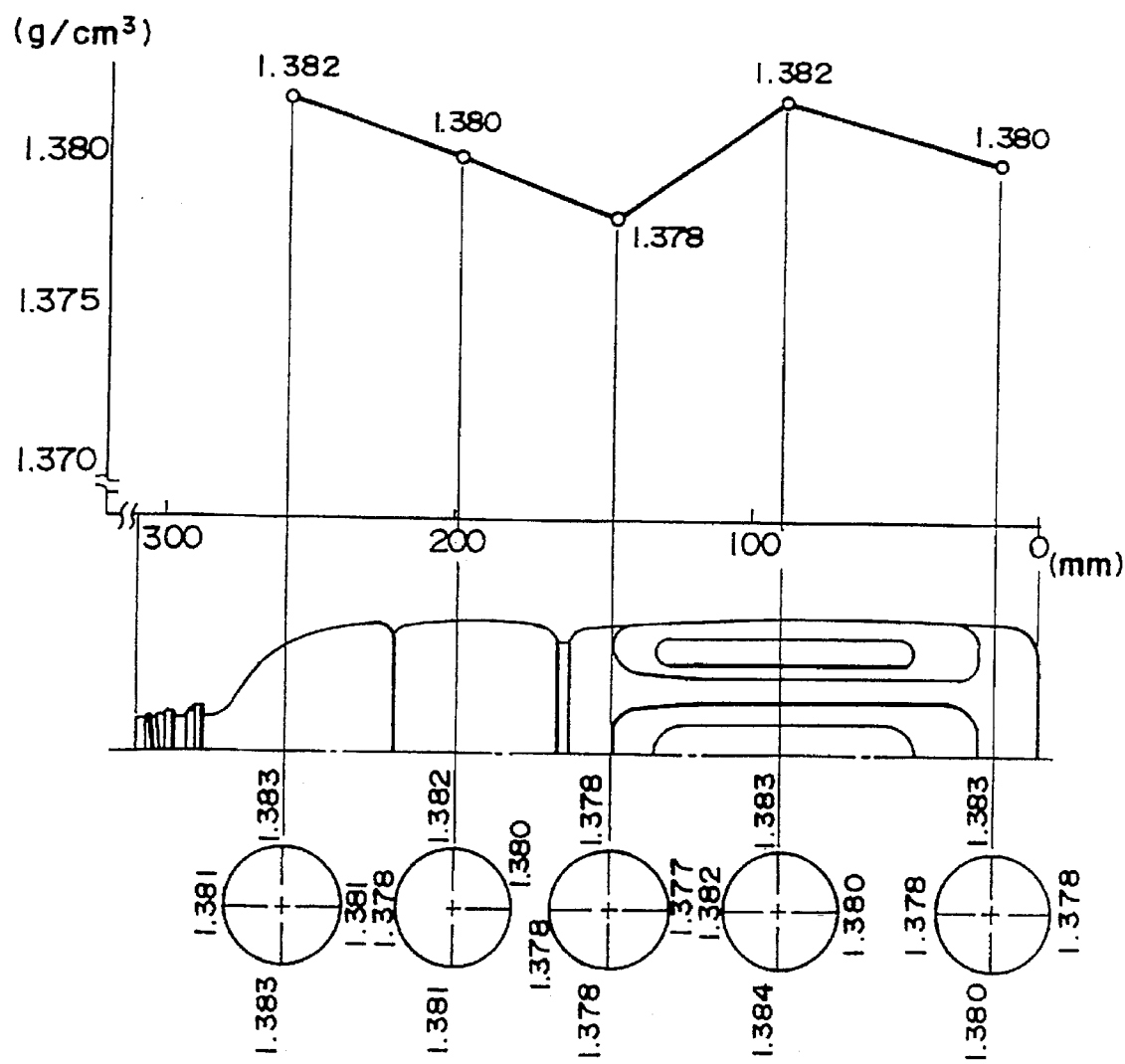
FIG. 6 is a diagram showing the heating furnace and a container width reforming means in the oven blow stage of FIG. 1.

FIG. 6 shows the crystal densities at various portions when experiments were conducted with the structure of FIG. 5. As is apparent from the experimental data, it is certain that the degree of crystallization of the shoulder of the article is increased and that fluctuations in degree of crystallization is reduced at every individual portion in the circumferential direction.

According to the foregoing embodiments, during the heat treatment to be carried out before the second blow molding, hot air is blown vertically along the primary blow molded article 70 to increase the heat conductivity causing the increase of amount of heat to be received by the primary blow molded article 70, so as to shorten the temperature rising time of the primary blow molded article. Therefore, the length of heating travelling path or the cycle time is reduced so that the molding apparatus can be prevented from becoming larger in size.

On the other hand, in this embodiment, there is provided a structure for obtaining a heat-resistant container free of fins. This structure will now be described as follows.

Figure 7:
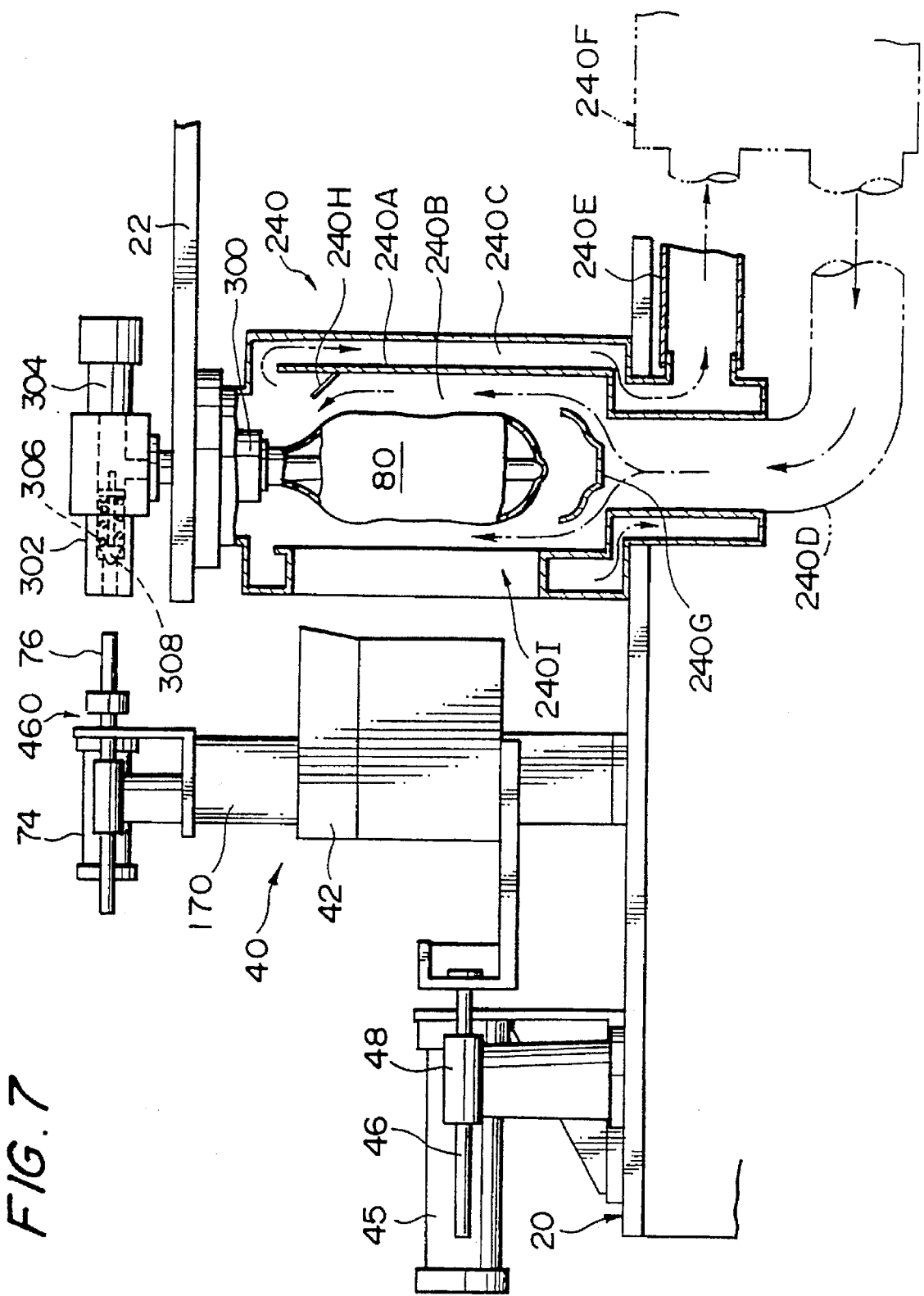
FIG. 7 is a fragmentary plan view of the container width reforming means of FIG. 6.
Figure 8:
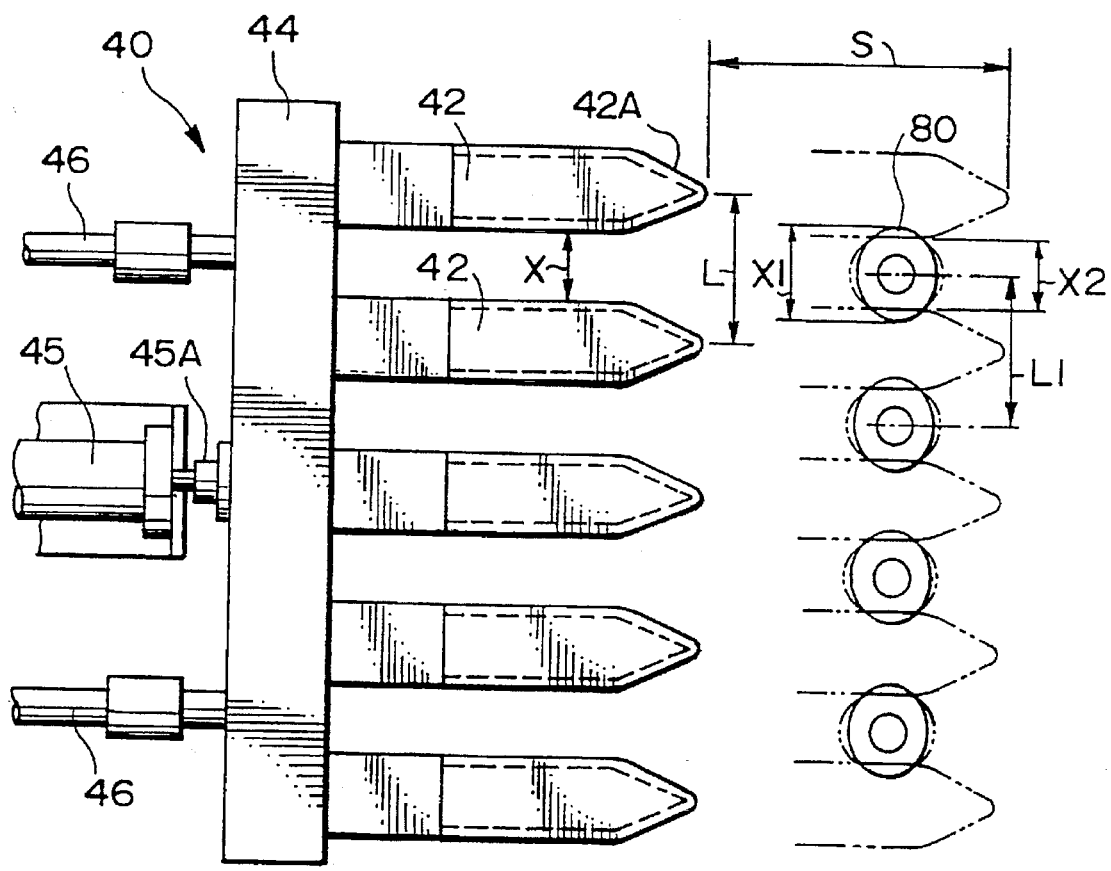
FIG. 8 is a perspective view showing reforming guides to be used in the container width reforming unit of FIG. 6.
Figure 9:
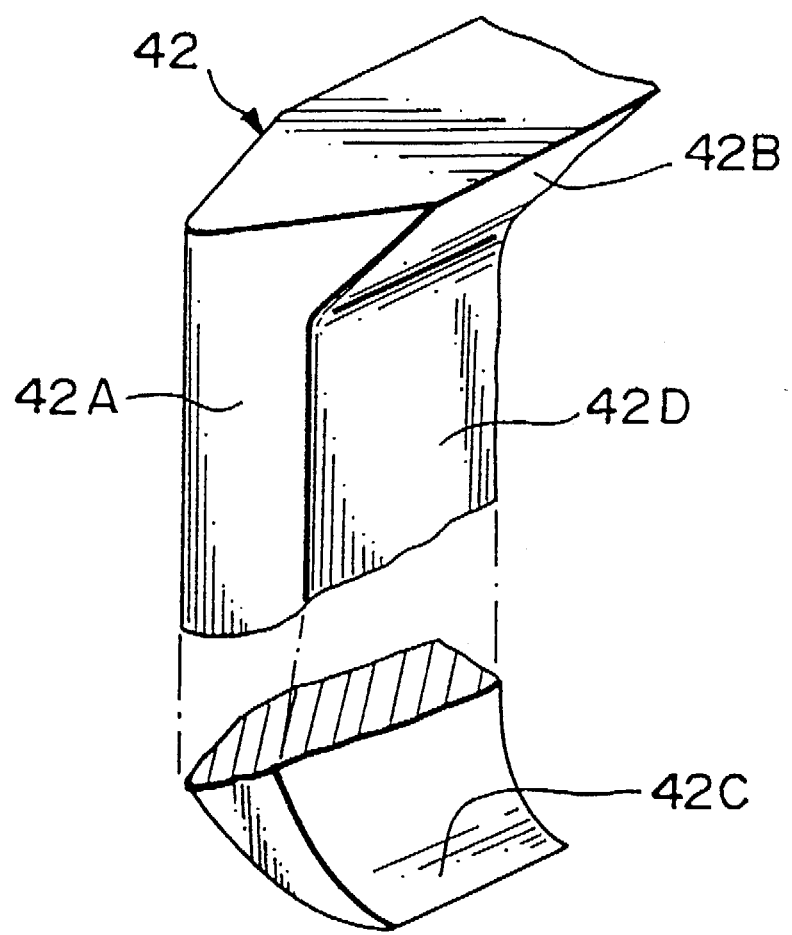
FIG. 9 is a fragmentary perspective view showing a blow mold clamping means to be used in the oven blow stage of FIG. 1.

As shown in FIG. 1, sidewardly of the heating furnace 240 of the fifth heating station 240E situated upstream of the second blow molding station 30, a container width reforming means 40 is located, whose structure is shown in FIGS. 7 to 9.

In FIG. 7, the outer wall and partition 240A of the heating furnace 240 situated in the fifth heating station 240E has an opening 240I. Opposite to the opening 240I, the container width reforming means 40 equipped with a reforming guide 42 movable into and out of the heating furnace 240 is located. The heating furnace 240 is identical in construction with the heating furnace arranged in the first to fourth heating stations 240A to 240D, except that it has an opening 240I.

The container width reforming means 40 makes the outside diameter of the thermally shrunk article 80 in the heating furnace 240 smaller than the outside diameter of the secondary blow molded product 90.

As shown in FIG. 7, the container width reforming means 40 includes, as main components, reforming guides 42, a drive 45, 46, 48 for driving the reforming guides 42 into and out of the heating furnace 240, and a valve drive mechanism 460 for canceling the increase of internal pressure of the thermally shrunk molded article 80.

In FIG. 8, the container width reforming means 40 has five reforming guides 42 for pressing opposite side surfaces of four articles 80 to reduce them in dimension in the direction of arrangement. Each reforming guide 42 is fixedly connected at its base to a reciprocating plate 44 and has a taper surface 42A on a front end extending toward the opening 240I of the heating furnace 240. The vertical shape of the front end portion, as partially shown in FIG. 9, is such that its upper part is formed on an inclined surface 42B along the shape of the shoulder of the secondary blow molded product 90 while its lower part is formed as a round portion 42C approximate to the shape of the heel of the secondary blow molded product 90, there being a vertical wall surface 42D between the upper and lower parts. Therefore, the reforming range of the reforming guides 42 covers from the shoulder to heel of the thermally shrunk article 80. On the surface of each reforming guide 42, a removing layer such as of Teflon (trade name) is formed to prevent the reforming guide 42 from sticking to the thermally shrunk article 80 when it is retracted from the article 80, so that the surface of the article will be prevented from being scratche.

Further, in FIG. 8, the pitch (L) of arrangement of the individual reforming guides is set to a value equal to the pitch (L1) of arrangement of the articles 80. The distance X between adjacent surfaces of the reforming guides 42 is a dimension by which the outside diameter X1 of the inadequately shrunk article 80 is to be corrected to a smaller outside diameter X2(X=X1>X2). The dimension in the direction of arrangement of the articles 80 is the dimension in the direction parallel to the parting surfaces of a second blow mold. Therefore, if the shrunk dimension X1 is set to a value smaller than the horizontal dimension of the cavity of the secondary blow mold, no part of the article will not be sandwiched between the mold halves of the second blow mold.

The drive for the reforming guides 42 includes an air cylinder 45 having a piston 45A (FIG. 8) which is fixed to the rear surface of the reciprocating plate 44. The stroke (S) of the piston 45A is set to a value such that the reforming guides 42 can come into the spaces between the articles and to a position confronting to the outermost side surfaces. A pair of guide rods 46 is fixed to the reciprocating plate 44 and is supported by a support bracket 48 fixed on a base. The reciprocating plate 44 is thereby guided so as to be movable in a direction perpendicular to the direction of arrangement of the articles 80.

Therefore, the reforming guides 42, as indicated by broken lines in FIG. 8, can come into the spaces between the thermally shrunk articles 80 and to the opposite sides of the outermost thermally shrunk articles 80, 80, and can be retracted from the inserted position to a position (solid-line position in FIG. 8) as not to obstruct the movement of the articles 80.

The air cylinder 45 is set to an operative position by a non-illustrated control means which inputs a signal from a detector (not shown) for detecting whether the thermally shrunk articles confront the container width reforming means 40. After the lapse of slight time delay from the signal input, the control means outputs to the air cylinder 45 an instruction for driving the reforming guides 42 forwardly. During this time delay, the valve drive mechanism 460 assumes a standby position, whereupon it shifts to its position in which the increase of interior pressure of the thermally shrunk article is canceled.

On the base at the side of the container width reforming means 40, the valve drive mechanism 460 is mounted for releasing the increase of interior pressure from the article 80 during the reforming when the interior pressure of the article 80 is increased.

A cap member 300 for holding the neck of the article 70, 80, 90 airtightly will described. As shown in FIG. 7, the cap member 300 has an air blow supply passageway 302 for supplying pressurized air during the second blow molding, and an air leak passageway 304 for leaking air in the article to adjust the internal pressure during the heating. The air blow supply passageway 302 is equipped with a valve 308 which is urged by a spring 306 to normally close the passageway 302.

The valve drive mechanism 460 drives the valve 308 to open, when the side surfaces of the article 80 is pressed by the reforming guides 42, to leak air so that the internal pressure of the article 80 is prevented from rising in response to the pressure.

The valve drive mechanism 460 of FIG. 7 includes an air cylinder 74 supported by a fixed support 170 mounted on the base, and an air extractor rod 76 fixed to the outer end of the piston of the air cylinder 74. The valve drive mechanism 460 causes the air extractor rod 76 to project toward the valve 308, during the reforming of the thermally shrunk article 80, to open the valve 308 against the spring 306.

The period of projection of the air extractor rod 76 is set by the control means. In this embodiment, this projection starts when four articles 80 are brought to a position confronting the container width reforming means 40. The air extractor rod 76 keeps the projected position to hold the valve 308 open until the reforming guides 42 are removed from articles 80.

In this embodiment, pivotally movable reforming guides adapted to be arranged between the articles 80 may be substituted for the reforming guides each having the reciprocatingly movable taper surface. Further, the reforming guides may be equipped with a temperature control means, such as a heater or a cooler, so that the article at part touching the reforming guides 42 will be prevented from being excessively cooled or heated.

In this embodiment, a structure for preventing the mold from being opened is provided. This structure will now be described in detail.

Figure 12:
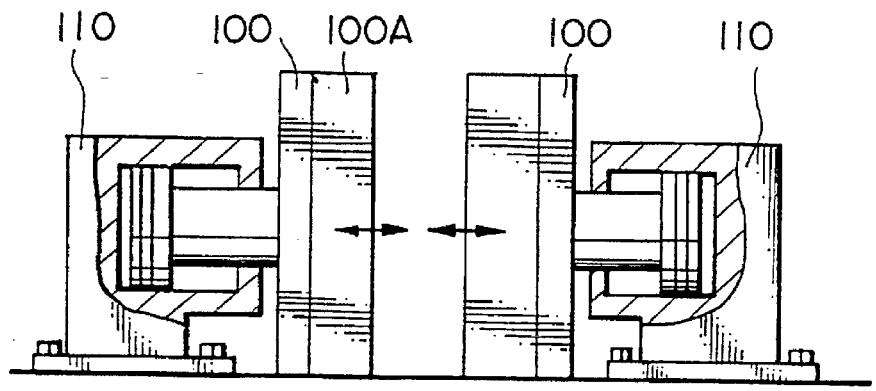
FIG. 12 is a schematic view showing a conventional secondary blow mold clamping means.

Generally, in the blow molding, such as shown in FIG. 12, the preventing structure includes a hydraulic actuator 110 mounted on the rear surface of a mold clamp disc 100 supporting a blow mold 100A. The opening and closing operation and the clamping operation for the blow mold 100A are performed by the same hydraulic actuator 110.

Figure 13A:
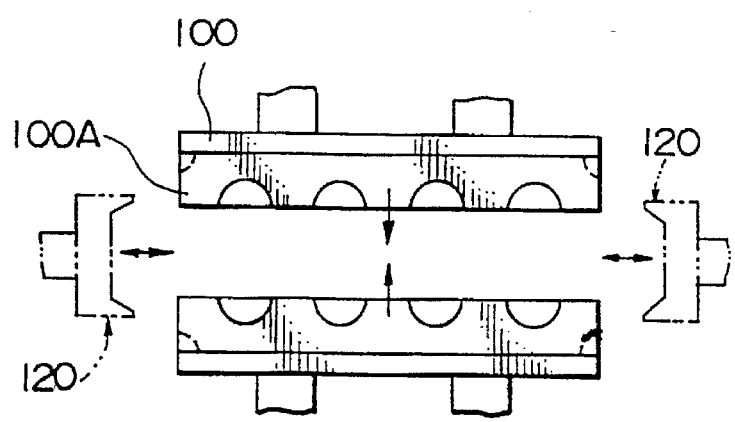
FIG. 13A is a plan view showing one example of conventional secondary blow mold lock members.

In order to prevent the mold from being opened during the blow molding, a structure for locking the mold in closed position is used. As shown in FIG. 13A, a lock means 120 includes a pair of engaging members in opposite ends of engaging recesses of the blow mold 100A, and a pair of engaging members to be received in the respective engaging recesses. In the blow molding, the blow pressure will increase remarkably high. Therefore it is necessary to prevent the blow mold from being opened against the blow pressure. If a hydraulic actuator is to be used to clamp the mold, the diameter of a piston inserted into the cylinder of the hydraulic actuator must be large enough to produce a great clamping force. In the case of a large-diameter cylinder, since a great quantity of oil is necessary to close and open the mold quickly, large impact force also would act when the mold halves strike against each other. If such collisions are repeated during the molding, the mold will undergo fatigue considerably. On the other hand, the lock means is necessary to detour the narrow space between the rotary disc and the base when the article is blow molded as suspended and held on the rotary disc.

Figure 13B:
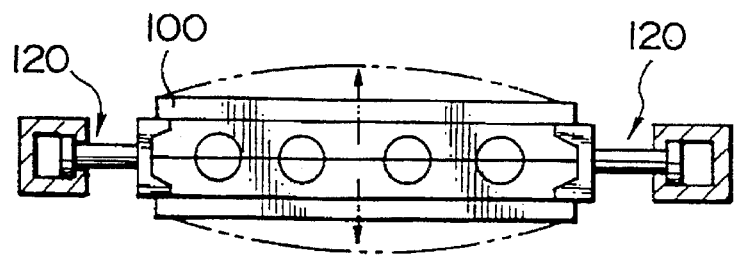
FIG. 13B is a plan view showing the operation of the conventional secondary blow mold lock members of FIG. 13A.

Consequently, for example, if a pressure larger than a predetermined clamping force is required as the container cross-sectional area is very large, or if the container to be formed is of a type difficult to shape, the blow pressure will surpass the clamping force occasionally. When this phenomenon happens if the number of articles to be molded at once is large, the length of the blow mold is necessarily long so that the blow mold would tend to be bent centrally, as indicated by dash-and-two-dot lines in FIG. 13B. Therefore, even using the locking means, it occasionally happened that the closed mold could not be reliably prevented from being opened during the molding. If the mold is thus opened, part of the article would be sandwiched between the parting surfaces of the blow mold to project as fins on the final product.

Figure 10:
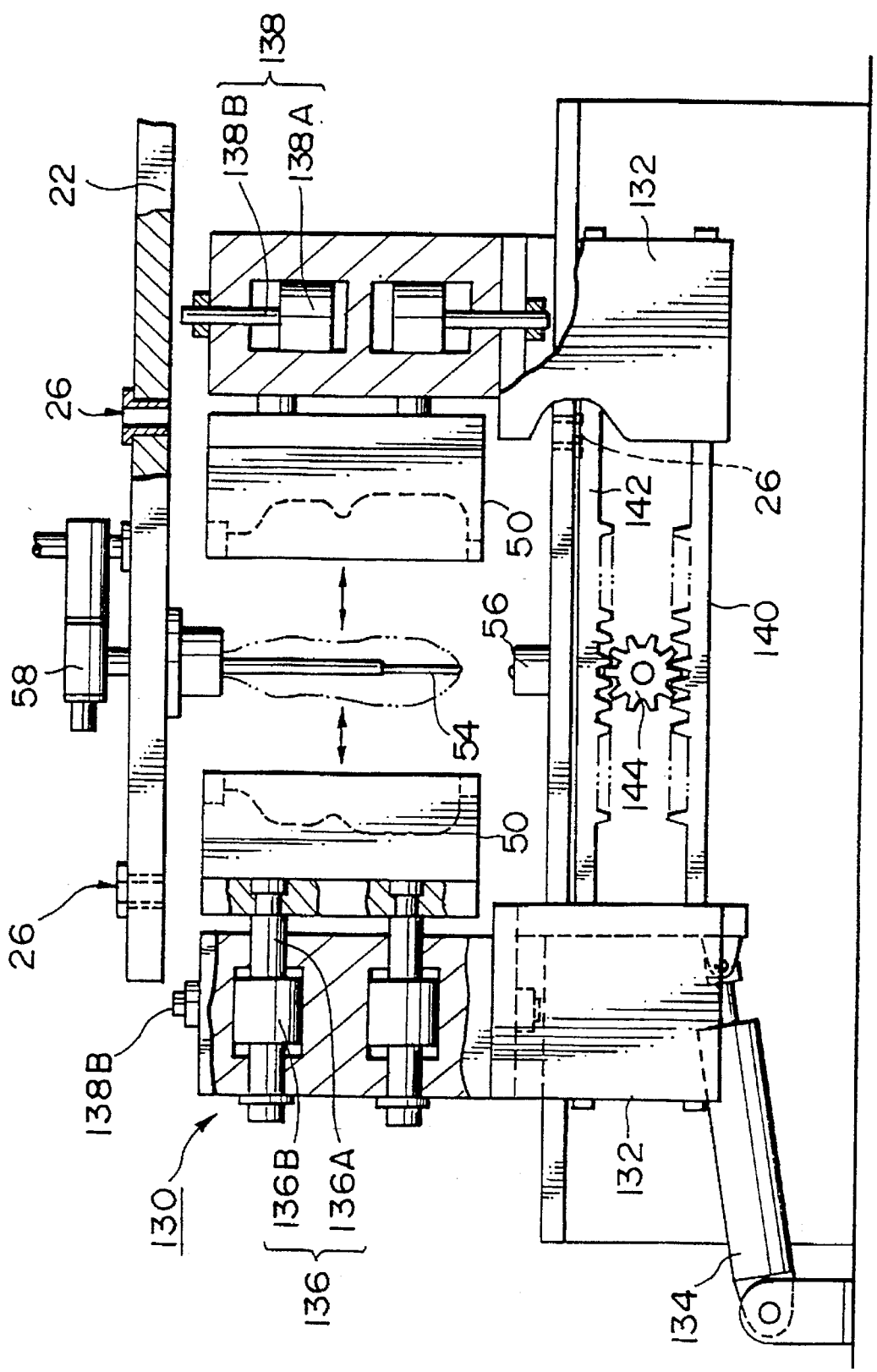
FIG. 10 is a diagram showing one form of the blow mold clamping means of FIG. 9.
Figure 11:
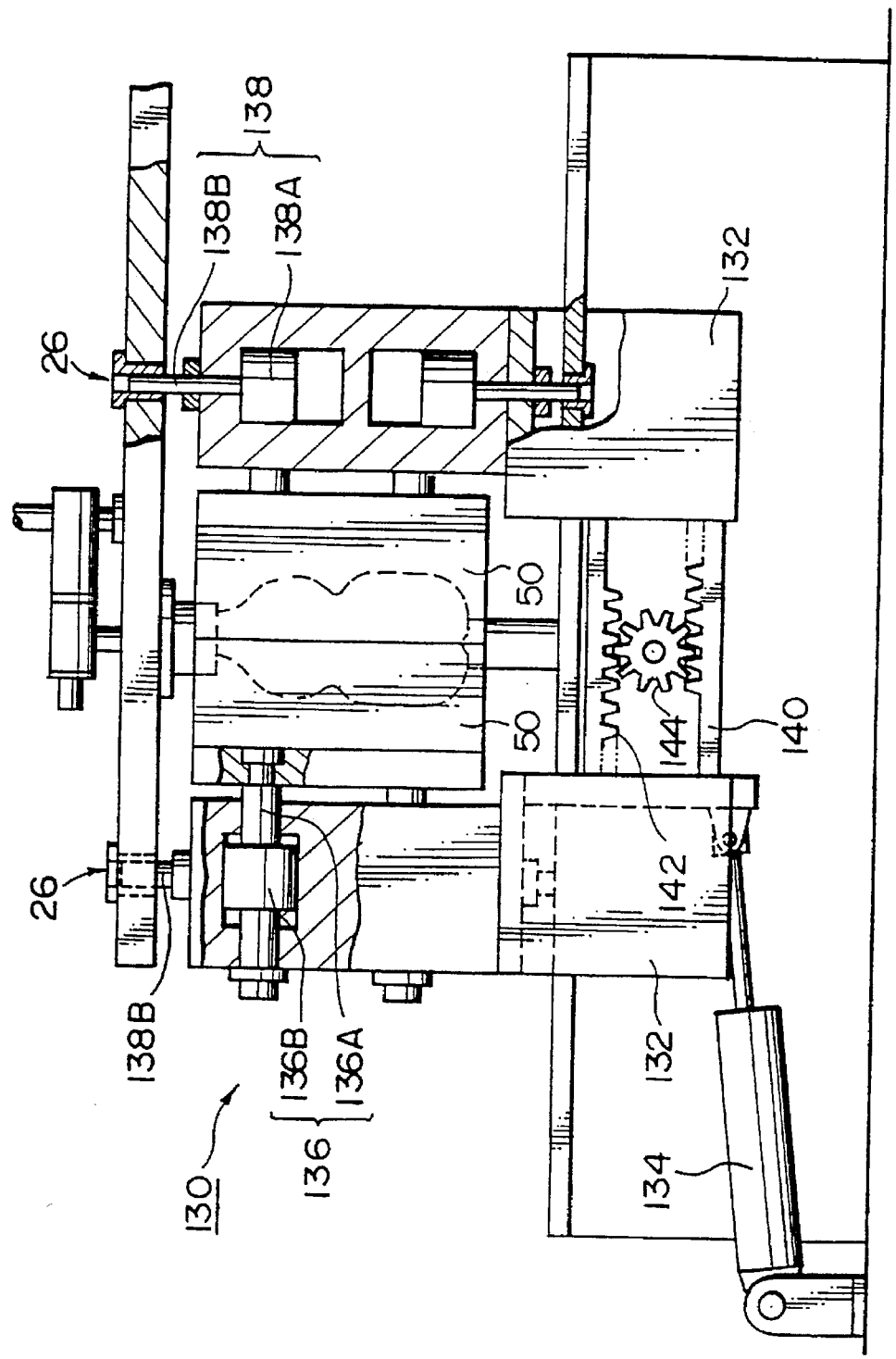
FIG. 11 is a diagram showing a conventional mold clamping means to be used in the oven blow stage of FIG. 1.

FIGS. 10 and 11 show a blow mold clamping means 130 located in the second blow molding station and equipped with a blow mold composed of a pair of mold halves which are openable and closable radially of the rotary disc 22.

The clamping means 130 includes mold support bases 132, an air cylinder 134, a mold clamping member 136, and a lock member 138.

The mold support bases 132 close to sandwich the primary blow molded article 70 hanging from the rotary disc 22 and are movable toward and away from each other. In this embodiment, a structure for moving the mold support bases 132 toward and away from each other includes a pair of racks 140, 142 and pinion 144. The racks 140, 142 are slidably mounted and guided on the base of the oven blow molding apparatus 10, meshing the pinion 144.

In order to move the racks 140, 142, the air cylinder 134 constituting a high-speed actuator is connected to one of the mold support bases 132. The air cylinder 134 is set up for the initial position in which the piston 134A is retracted. Therefore, while the initial position of the air cylinder 134 is set, the mold support bases 132 are situated in positions remote from each other, opening the blow mold 50. The high-speed actuator in this embodiment is set up for a value higher than a plunger 136A of the mold clamping member 136.

The mold clamping member 136 is fixed to the upper surfaces of the mold support bases 132. Inside the mold clamping member 136, there are mounted the plunger 136A constituting the drive rod for clamping the blow mold 50, and the lock member 138 for locking the mold clamping member 136 in locked position.

The plunger 136A projects outwardly from the mold clamping member 136 at a number of positions or opposite positions in the longitudinal direction of the blow mold 50, and the base of the plunger 136A is fixed to the piston 136B inserted into a chamber of the mold clamping member 136. A mold base plate 52 to which the blow mold 50 is fixed is attached to the front end of the plunger 136A. The confronting spaces each sandwiched between the pistons 136B in the chamber are filled with a non-compressive fluid such as oil; as the supplying and discharging of the non-compressive fluid between the spaces are controlled, the pistons 136B will be reciprocatingly moved.

In this structure, the mold support bases 132 are located in closed position in which the parting surfaces of the blow mold 50 slightly touch each other, and when the lock member 138 is being locked, the pistons 136B project. Therefore, as the pistons 136B project, the parting surfaces of the blow mold 50 are pressed to clamp the mold. The pressure to be used for clamping is set to at least 40 kg/cm$^2$. The stroke of the piston 136A is set to a value substantially equal to the sum of the gap between the rod 138B of the lock member 138 and the rotary disc 22 and the gap between the rod 138B and the base, particularly a very small stroke of 0.3 to 0.4 mm.

The lock member 138 has a rod 138B fixed to the piston 138A inserted into the chamber in the mold clamping member 136. The rods 138B are arranged at the upper and lower sides of the mold clamping member 136 and are movable toward and away from the base and the rotary disc 22 in response to the reciprocating movement of the piston 138A. The lock members 138 have a function of locking the mold support bases 132 in closed position of the blow mold 50 by engaging the fitting portions 26 formed in the rotary disc 22. When blow pressure is loaded after clamping, the mold is kept closed under the blow pressure.

Inside the chambers in which the pistons 138A are received, the confronting spaces sandwiched between the pistons 138A are filled with air; the rods 138B are vertically moved toward and away from each other as the supplying and discharging air into and out of the spaces is controlled. This control takes place based on that the rods 138B are inserted into the fitting portions 26 when the mold support bases 132 are closed.

In each fitting portion 26, a substance is fitted in a hole formed in the rotary disc 22 so that the rotary disc 22 is prevented from being damaged when the rods 138B strike the substance in the hole.

Reference numeral 54 in FIG. 10 designates a rod having a function of restricting the shrinkage and centering while the primary blow molded article is being thermally shrunk; 56, a bottom template of the blow mold 50; and 58, a blow core connected to a holder and mounted in a check valve for allowing a pressurized fluid in the direction of supply.

With this structure, the mold support bases 132 can be moved, by the air cylinder 134 connected to one mold support bases 132, at high speed to closed position in which the parting surfaces of the blow mold 50 faintly strike against each other. When the molded support bases 132 are moved to the closed position, the rod 138B of the lock member 138 is locked with respect to the fitting portions 26 of the rotary disc 22 and the base by the air supply/discharge control. Therefore, when it is detected that the mold support bases 132 have been moved to a predetermined position and that the rock member 138 has been locked, the mold clamping members 136 are moved, by means for supplying and discharging non-compressive fluid such as oil, with a stroke smaller than the opening and closing stroke of the blow mold 50, to press the parting surfaces of the blow mold 50 against each other. Now, when the secondary blow molding takes place for the thermally shrunk article 80 placed in the blow mold 50, the blow pressure acts on the blow mold 50. By this pressure, the lock members 138 are received by the fitting portions 26 of the rotary disc 22 and the base, and the mold clamping members 136 are held in the clamping position.

Upon termination of the secondary blow molding, the pressure to the blow mold 50 is freed by non-compressive fluid supply/discharge control in the mold clamping members 136, and then the rods 138B of the lock members 138 are unlocked. Then the air cylinder 134 restores the original position.

According to this structure, partly since the mold support bases for closing and opening the mold are driven to move toward and away from each other at high speed using the air cylinder, and partly since the mold clamping members having a stroke smaller than the stroke of the mold support bases are driven using non-compressive fluid, it is possible to perform the closing and opening of the mold quickly. Further, since the stroke using non-compressive fluid is reduced, the mechanism using such fluid can be reduced in size. Since locking by the rotary disc and the base takes place vertically of the mold support bases, it is possible to prevent the mold from being opened even when the blow pressure is exerted on the mold in the opening direction.

In this embodiment, the apparatus is also equipped with a structure which makes the final product discharge means simple in structure and performs accurate sorting.

Figure 14:
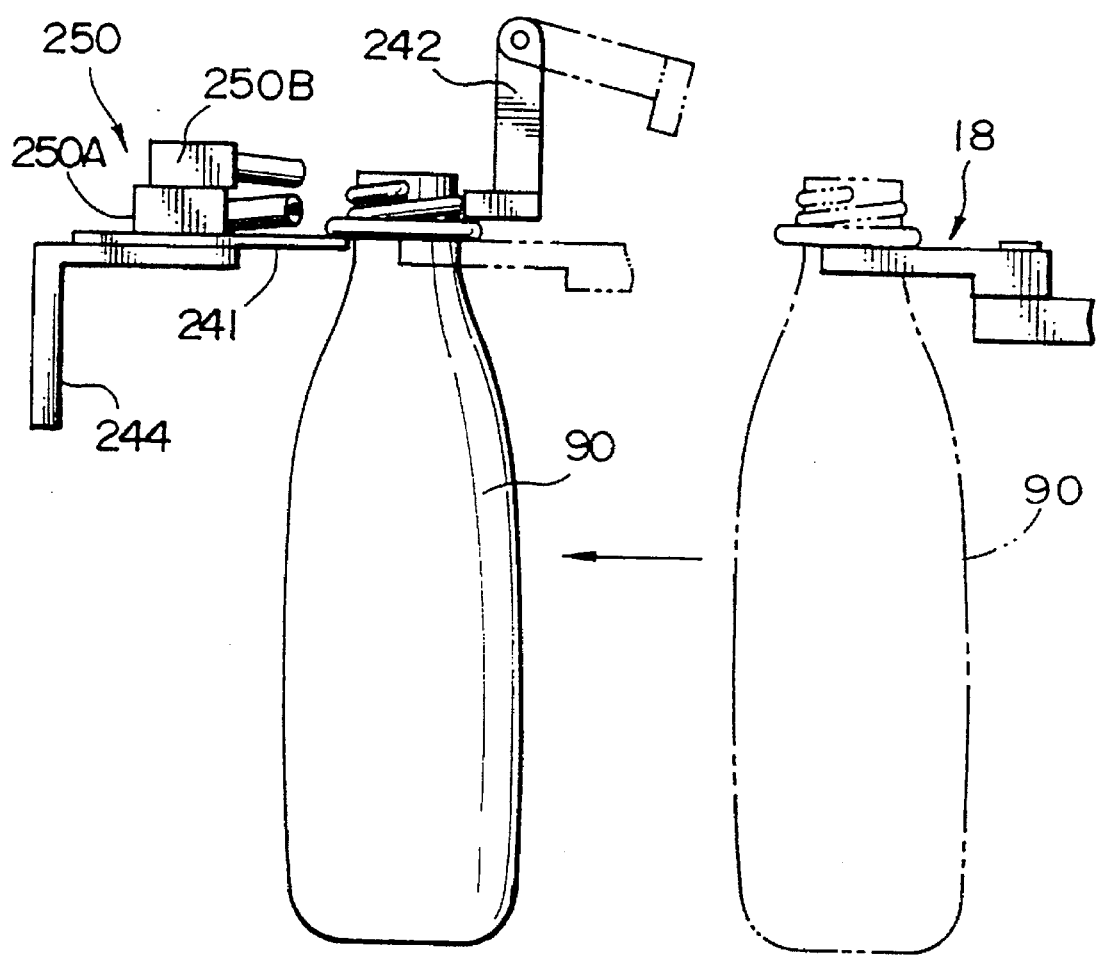
FIG. 14 is a diagram showing a discharge station and a discharge means in the oven blow stage of FIG. 1.

The discharge station 14, as shown in FIGS. 1 and 14, has a discharge means 18. The discharge means 18 is a chuck which supports the lower surface of a support ring formed on the neck of the secondary blow molded product 90 and which discharges the secondary blow molded product 90 out of the travelling path on the rotary disc 22. A conveying guide 241 is situated at the product discharge position, constituting part of the article discharge path. A pivotable guide 242 is situated opposite to the conveying guide 241. The conveying guide 241 is in the form of a flat plate attached to the upper surface of a guide support 244 fixed on the base.

The pivotable guide 242 is pivotally movable between a retracted position (dash-and-two-dot-line position in FIG. 14) and another position in which the guide 242 supports the side surface of the neck of the secondary blow molded product 90. Before the discharge means 18, which has discharged the product 90, is returned from the broken line position to the solid-line position in FIG. 14, the pivotable guide 242 comes in contact with the side surface of the neck of the secondary blow molded product 90 to prevent the secondary blow molded product 90 from falling down.

On the upper surface of the conveying guide 241, a moving means 250 for the secondary blow molded product 90 is situated.

The moving means 250 moves the products 90 in opposite direction in the same line along the discharge path 14A, based on the reference of selection of secondary blow molded articles 90 discharged onto the conveying guide 241.

Figure 15:
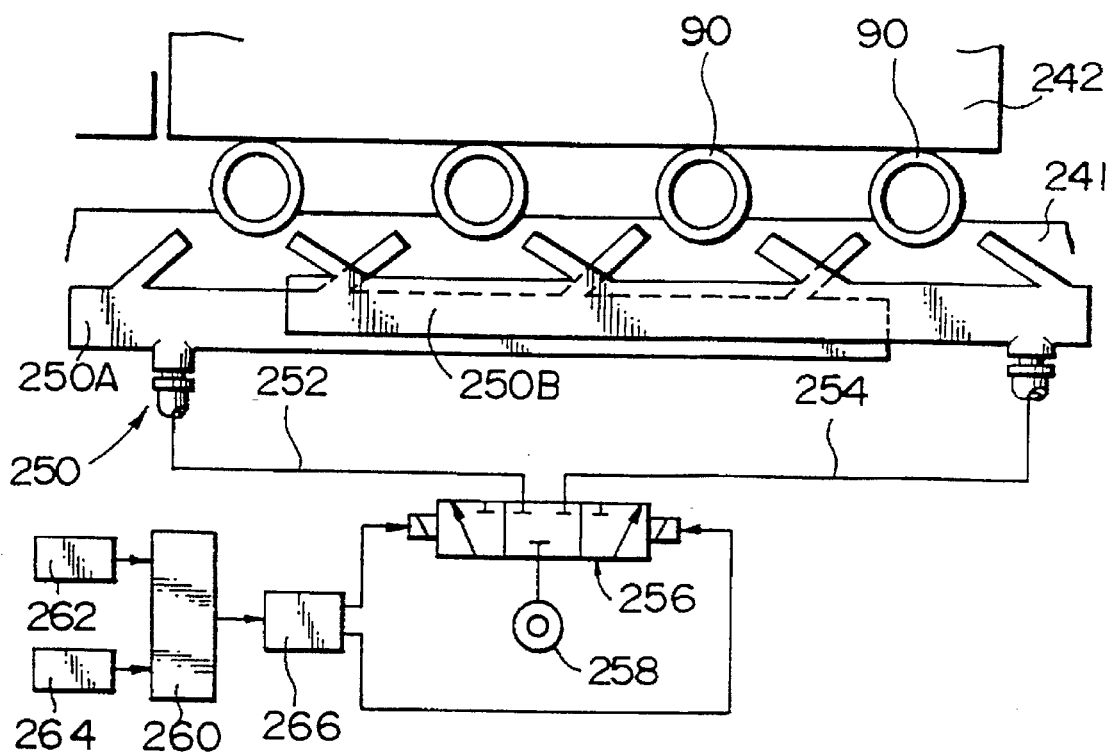
FIG. 15 is a schematic view showing a sorting structure for sorting qualified articles and fault articles from one another in the discharge station of FIG. 14.

The moving means 250 is equipped with a double-step air ejection nozzle header 250A, 250B laminated on the upper surface of the conveying guide 241. The air ejection nozzle headers 250A, 250B, as shown in FIG. 15, have nozzles inclined in opposite directions by such an angle as to obtain a component force for moving the secondary blow molded articles 90 along the extension of the discharge path 14A.

Each of the air ejection nozzle headers 250A, 250B has an air chamber communicating with nozzles. To this air chamber, an electromagnetically powered three-way switch valve 256 is connected via, for example, pipes 252, 254. The three-way switch valve 256 is located at a position for shutting out the communication between the individual pipes 252, 254 and an air pump 258. The three-way switch valve 256 is operatively connected with a control unit 260 for selectively setting the communication between the air pump 258 and the individual pipes 252, 254.

The control unit 260 includes a moving control means for controlling the direction of moving the secondary blow molded articles as final products; the main part of the control unit 260, for example, is constituted by a micro computer.

To the input side of the control unit 260 via a non-illustrated I/O interface, there are connected a sensor 262 for detecting the number of primary blow molded articles 70 supplied from the conveying station 12 and held in one block of the rotary disc 22, and a gap sensor 264 for detecting the gap between the parting surfaces in the mold clamping means 30 during the secondary blow molding. To the output side of the control unit 260 via the I/O interface, there are connected a drive means 266 for the three-way switch valve 256. Of the foregoing sensors, the sensor 262 may be, for example, an optical sensor, and the gap sensor 264 may be, for example, an optical sensor or a piezoelectric sensor for detecting a pressure between the parting surfaces. In addition to these sensors, for instance, if a neckpiece is to be inserted into an injection cavity mold during injection molding of a preform, an optical sensor (not shown) for detecting whether the neckpiece is removed may be connected to the input side of the control unit 260.

In the control unit 260, as the reference of selection for the final products, normal/abnormal discrimination results using the outputs from the foregoing sensors 262, 264 are used. The case where abnormal molding takes place is exemplified: the case where the number of primary molded articles does not reach the hold numbers of the rotary disc 22; the case where mold matching in the blow mold clamping means 30 is not appropriate; or the case where the neckpiece is removed. In such case, the three-way switch valve 256 will be energized to supply air to the air ejection nozzle headers as set up in the direction of discharging the abnormal article. When it has been discriminated from the outputs from the sensors 262, 264 that no abnormal molding took place, air will be supplied to the air ejection nozzle headers as set up in the direction of discharging normal articles.

In this structure, the moving direction for the secondary blow molded articles 90 whose necks are held by the pivotal guide 242 is determined by the convconveying guide 241 in the discharge station 14 and the moving means 250. Therefore, since the control unit 260 previously determines the moving direction based on the output signals from the sensors 262, 264, it will be determined according to the previous determination whether or not air should be supplied to the air ejection nozzle headers 250A, 250B of the three-way switch valve 256. Therefore, when the secondary blow molded product 90 moved to the discharge station 14 is obtained by normal molding, the moving direction for qualified articles will be set by the air ejection nozzle headers 250A, 250B. When it is obtained by abnormal molding, the moving direction for fault articles will be set by the air ejection nozzle headers 250A, 250B. As a result, the secondary blow molded articles 90 will be blown away on the discharge station 14 by air ejection from any one of the air ejection nozzle headers and will then be conveyed to a predetermined storing unit.

In the foregoing structure, a two-way switch valve may be substituted for the three-way switch valve. For instance, if the final products are to be packed in a box, a counter for counting the total number of the secondary blow molded articles discharged for storage may be connected to the input side of the control unit. Therefore, using the counter, it is possible to prevent the secondary blow molded articles from overflowing. According to such structure, the sorting of finally molded articles can be performed by selecting the direction of discharging the articles of opposite directions in the same line on the discharge station. It is therefore possible to sort normal articles and abnormal articles using the existing discharge station, without making the apparatus large in size and complex in structure.

What is claimed is:

1. A method of forming a heat-resistant container, comprising the steps of:
   (a) introducing a primary blow molded article into a heating furnace having a pair of first air blow guide members separated by a traveling path of the primary blow molded article and conveyinq the primary blow molded article along the traveling path;
   (b) thermally shrinking the primary blow molded article by exposing the entire circumferential surface of a barrel portion of the primary blow molded article to hot air having a temperature high enough to facilitate crystallization of the primary blow molded article by blowing the hot air from one end of the furnace inside said pair of first guide members longitudinally along the primary blow molded article as the primary blow molded article is conveyed along the traveling path; and
   (c) secondary blow molding the thermally shrunk primary blow molded article in a cavity of a secondary blow mold composed of a pair of mold halves, thereby shaping the primary blow molded article into the heat-resistant container.

2. A heat-resistant container forming method according to claim 1, wherein said thermally shrinking step includes heating with hot air a plurality of primary blow molded articles transferred at regular intervals within the heating furnance synchronized with every termination of said secondary blow molding, and blowing hot air from a hot air source to the primary blow molded article longitudinally from one end to the other inside said pair of first air blow guide members.

3. A heat-resistant container forming method according to claim 2, wherein said thermally shrinking step further includes blowing hot air from a bottom portion of the primary blow molded article, and guiding hot air to the barrel portion of the primary blow molded article by a second air blow guide member for masking the bottom of the primary blow molded article in the heating furnace so as not to expose the bottom directly to hot air, and returning the hot air, after touching the barrel, to the hot air source via the outside of the first air blow guide members from a side remote from the bottom.

4. A heat-resistant container forming method according to claim 2, wherein said thermally shrinking step further includes guiding hot air along a shoulder of the primary blow molded article by a third air blow guide member which is situated around and sloping alongside the shoulder.

5. A heat-resistant container forming method according to claim 2, wherein said thermally shrinking step further includes returning the hot air, after flowing the hot air longitudinally along the barrel and past the shoulder, to the hot air source via the outside of the first air blow guide member.

6. A heat-resistant container forming method according to claim 2, wherein said introducing step includes introducing a plurality of primary blow molded articles as a set simultaneously into the heating furnace, said thermally shrinking step includes heating a plurality of sets of primary blow molded articles placed in the heating furnace, introducing each set of primary blow molded articles upon every termination of said secondary blow molding step, discharging a leading set of primary blow molded articles out of the heating furnace, and introducing a new set of primary blow molded articles into the heating furnace, and wherein said second blow molding step includes secondary blow molding simultaneously the set of primary blow molded articles discharged out of the heating furnace.

7. A heat-resistant container forming method according to claim 6, wherein said thermally shrinking step further includes controlling a total heating time, which is a heating time necessary to obtain a degree of crystallization of at least 1.373 g/cm$^3$ for the barrel of a single primary blow molded article in the heating furnace, by varying the wind speed and/or temperature of hot air.

8. A heat-resistant container forming method according to claim 6, wherein said thermally shrinking step includes blowing the hot air, whose temperature is sufficient to facilitate crystallization of the primary blow molded article, at a wind speed of at least 0.6 m/sec, and setting the total heating time to at most one minute, which is a heating time necessary to obtain a degree of crystallization of at least 1.373 g/cm$^3$ for the barrel of a single primary blow molded article in the heating furnace.

9. A heat-resistant container forming method according to claim 8, wherein said thermally shrinking step is performed with setting the temperature of hot air within a range of 230° to 260° C. and the wind speed of hot air within a range of 0.6 to 4.0 m/sec.

10. A method of forming a heat-resistant container, comprising the steps of:
   (a) introducing a primary blow molded article into a heating furnace;
   (b) thermally shrinking the primary blow molded article by exposing the entire circumferential surface of a barrel portion of the primary blow molded article to hot air having a temperature high enough to facilitate crystallization of the primary blow molded article by blowing the hot air longitudinally along the primary blow molded article, wherein said thermally shrinking step further includes reforming the outer diameter of the primary blow molded article in a direction parallel to parting surfaces of mold halves of a secondary blow mold to have a diameter smaller than the transverse width of the cavity of the mold halves by pressing facing sidewalls of the barrel portion of the primary blow molded article inwardly; and (c) secondary blow molding the thermally shrunk primary blow molded article in a cavity of the secondary blow mold thereby shaping the primary blow molded article into the heat-resistant container.

11. A heat-resistant container forming method according to claim 10, wherein said thermally shrinking step further includes releasing an increasing inner pressure from the interior of the first blow molded article, when the sidewalls of the primary blow molded article are inwardly pressed, while said reforming step is performed with maintaining the inner pressure of the primary blow molded article at a predetermined value.

12. A method of forming a plurality of heat-resistant containers, comprising the steps of:

(a) introducing a plurality of primary blow molded articles as a set simultaneously into a heating furnace;

(b) thermally shrinking the set of primary blow molded articles by exposing the entire circumferential surface of a barrel portion of each of the primary blow molded articles to hot air having a temperature high enough to facilitate crystallization of each primary blow molded article by blowing the hot air longitudinally along the primary blow molded article, wherein said thermally shrinking step includes inserting reforming means for pressing the facing sidewalls of the barrel portion of each primary blow molded article inwardly, along opposite sides of each primary blow molded article in the direction of arrangement of one set of primary blow molded articles, and reforming the outer diameter of each of the primary blow molded articles in a direction parallel to parting surfaces of mold halves of a second blow mold to have a diameter smaller than the transverse width of the cavity of the mold halves; and (c) secondary blow molding the set of thermally shrunk primary blow molded articles in a cavity of the secondary blow mold composed of the mold halves, thereby shaping the set of primary blow molded articles into the heat-resistant containers, wherein said thermal shrinking step further includes heating a plurality of sets of primary blow molded articles placed in the heating furnace, introducing each of the primary blow molded articles into the heating furnace after said second blow molding step, discharging a leading set of primary blow molded articles out of the heating furnace, and introducing a new set of primary blow molded articles into the heating furnace.

13. A heat-resistant container forming method according to claim 12, wherein said reforming step includes temperature-conditioning the reforming means to prevent the primary blow molded articles at portions in contact with the reforming means from being excessively cooled or heated.

14. A heat-resistant container forming method according to claim 12, wherein said thermally shrinking step further includes releasing an increasing inner pressure from the interior of the primary blow molded articles, when the sidewalls of the primary blow molded articles are inwardly pressed, while said reforming step is performed with maintaining the inner pressure of the primary blow molded articles at a predetermined value.

15. A heat-resistant container forming method according to claim 1, further comprising, after said secondary blow molding step, introducing the heat-resistant containers, which are taken out of the secondary blow mold, in opposite directions in the same line using a nozzle for ejecting air in opposite directions in the same line.

* * * * *